United States Patent
Al Sayeed et al.

(10) Patent No.: US 9,973,295 B2
(45) Date of Patent: *May 15, 2018

(54) SYSTEMS AND METHODS FOR CHANNEL ADDITIONS OVER MULTIPLE CASCADED OPTICAL NODES

(71) Applicant: Ciena Corporation, Hanover, MD (US)

(72) Inventors: Choudhury Al Sayeed, Gloucester (CA); David C. Bownass, Ottawa (CA); Loren S. Berg, Ottawa (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 13 days.

This patent is subject to a terminal disclaimer.

(21) Appl. No.: 15/001,359

(22) Filed: Jan. 20, 2016

(65) Prior Publication Data

US 2016/0134390 A1 May 12, 2016

Related U.S. Application Data

(63) Continuation of application No. 13/655,567, filed on Oct. 19, 2012, now Pat. No. 9,276,696.

(51) Int. Cl.
*H04J 14/02* (2006.01)
*H04B 10/079* (2013.01)
(52) U.S. Cl.
CPC ...... *H04J 14/0221* (2013.01); *H04B 10/0793* (2013.01); *H04B 10/07955* (2013.01)
(58) Field of Classification Search
None
See application file for complete search history.

(56) References Cited

U.S. PATENT DOCUMENTS

| | | | |
|---|---|---|---|
| 5,442,544 A | 8/1995 | Jelinek | |
| 6,668,137 B1 * | 12/2003 | Cordina | H04B 10/296 398/94 |
| 7,444,078 B1 * | 10/2008 | Stango | H04J 14/0217 359/334 |
| 7,826,748 B2 | 11/2010 | Yang et al. | |

(Continued)

OTHER PUBLICATIONS

Aggarwal et al., A Self-Tuning Analog Proportional-Integral-Derivative (PI D) Controller, 2006, IEEE.
PID Theory Explained, Mar. 29, 2011.

*Primary Examiner* — Ken N Vanderpuye
*Assistant Examiner* — Jai Lee
(74) *Attorney, Agent, or Firm* — Clements Bernard Walker PLLC; Christopher L. Bernard; Lawrence A. Baratta, Jr.

(57) ABSTRACT

A method, an optical node, and an optical network include a power controller configured to bring channels in-service in parallel over multiple cascaded optical nodes quickly, efficiently, and in a non-service affecting manner. The method, node, and network utilize multiple states of a control loop that maintains a stable response in downstream optical nodes as channels are added in parallel. Further, the power controller is configured to operate independently alleviating dependencies on other power controllers and removing the need for coordination between power controllers. The method, node, and network provide efficient turn up of dense wave division multiplexing (DWDM) services which is critical to optical layer functionality including optical layer restoration.

20 Claims, 12 Drawing Sheets

(56) References Cited

U.S. PATENT DOCUMENTS

| | | | |
|---|---|---|---|
| 7,873,274 B2* | 1/2011 | Collings | H04B 10/07955 398/18 |
| 7,983,560 B2 | 7/2011 | Maki et al. | |
| 8,077,384 B2* | 12/2011 | Mori | H04B 10/2935 359/334 |
| 8,095,008 B2* | 1/2012 | Collings | H04J 14/0205 398/83 |
| 8,135,280 B2* | 3/2012 | Zong | H04B 10/07955 398/34 |
| 8,160,446 B2 | 4/2012 | Collings et al. | |
| 9,276,696 B2* | 3/2016 | Al Sayeed | H04J 14/0221 |
| 2003/0058497 A1* | 3/2003 | Park | H04B 10/25133 398/82 |
| 2004/0208518 A1* | 10/2004 | Bosloy | H04J 14/0221 398/30 |
| 2004/0208577 A1* | 10/2004 | Cahill | H04B 10/296 398/83 |
| 2006/0018658 A1* | 1/2006 | Mori | H04J 14/0221 398/79 |
| 2007/0269215 A1* | 11/2007 | Sugaya | H04J 14/0221 398/95 |
| 2008/0267631 A1* | 10/2008 | Collings | H04J 14/0205 398/97 |
| 2008/0285973 A1 | 11/2008 | Uchiyama et al. | |
| 2009/0116837 A1 | 5/2009 | Boertjes et al. | |
| 2010/0091355 A1 | 4/2010 | Ota | |
| 2010/0104276 A1 | 4/2010 | Komaki | |
| 2010/0202777 A1* | 8/2010 | Liu | H04J 14/0204 398/83 |
| 2010/0221004 A1 | 9/2010 | Haslam et al. | |
| 2011/0176802 A1* | 7/2011 | Callan | H04B 10/296 398/38 |
| 2011/0200324 A1 | 8/2011 | Boertjes et al. | |
| 2011/0222846 A1 | 9/2011 | Boertjes et al. | |
| 2011/0222851 A1 | 9/2011 | Berg | |
| 2011/0222862 A1 | 9/2011 | Boertjes et al. | |
| 2011/0243555 A1* | 10/2011 | Callan | H04B 10/296 398/38 |
| 2011/0268442 A1 | 11/2011 | Boertjes et al. | |
| 2011/0274425 A1 | 11/2011 | Grobe | |
| 2014/0241715 A1* | 8/2014 | Han | H04B 10/294 398/38 |

* cited by examiner

SYSTEMS AND METHODS FOR CHANNEL ADDITIONS OVER MULTIPLE CASCADED OPTICAL NODES

CROSS-REFERENCE TO RELATED APPLICATION(S)

The present patent/application is a continuation of U.S. patent application Ser. No. 13/655,567, filed Oct. 19, 2012, and entitled "SYSTEMS AND METHODS FOR CHANNEL ADDITIONS OVER MULTIPLE CASCADED OPTICAL NODES," the contents of which are incorporated by reference.

FIELD OF THE INVENTION

Generally, the field of art of the present disclosure pertains to optical networking systems and methods, and more particularly, to systems and methods for parallel channel additions over multiple cascaded optical nodes.

BACKGROUND OF THE INVENTION

As optical networks have evolved, network deployments have moved from point-to-point configurations to interconnected mesh architectures with various reconfigurable components contained therein. The interconnected mesh architectures can be formed with various reconfigurable optical add/drop multiplexers (ROADMs) or other types of optical nodes. In an exemplary implementation, a ROADM can include a wavelength selective switch (WSS) and the process of adding a channel to each ROADM can include opening an associated pixel on the WSS. Of course, other implementations can be used for ROADMs. As optical node flexibility increases and the interconnected mesh architectures expand, channel addition becomes problematic especially over optical networks with multiple cascaded optical nodes. These challenges are further increased as different channels can have different A-Z paths through the network with various channels traversing different paths and multiple cascaded optical nodes. Thus, optical node and network flexibility leads to interconnection complexity.

First, to turn up a wavelength, conventional systems and methods can utilize a procedure by opening pixels in the WSS in multiple cascaded ROADM sections simultaneously or in quick sequence. However opening up pixels (or any other type of enabling scheme) without any sort of control may create significant overshoot on the wavelength being launched into the fiber, and further may insert non-linear interference to neighboring in-service wavelengths. Adding a large number of wavelengths on top of low-count in-service ones can also create significant DC power offset on the in-service wavelengths that could be traffic impacting as well.

Alternatively, conventional systems and methods can include turning up wavelengths in sequence over multiple optical nodes while setting actuator values dynamically in each optical node site in non-service affecting way following the completion of add action in upstream optical nodes. This is a sequential approach versus the aforementioned parallel approach. Few constraints have to be respected in that regard: (1) a controller in each optical node has to run in a close-loop fashion getting an updated optical power reading from an associated optical power monitor (OPM), (2) the delay between consecutive close loop controller iterations are limited by the associated OPM's scanning time to report the wavelength power and the actuator's attenuation settling time, and (3) while setting attenuation in each actuator, it has to maintain the target launch power into the fiber, or need to achieve the power of the already in-service wavelengths of similar transmitter type into the fiber. Such controlled sequential method ensures proper power settings for each section, and mitigates any impact to currently deployed channels. Plant related drifts and aging effects (e.g. Micro-electromechanical systems (MEMS) based WSS pixel drifts, and pixel offsets due to aging) adds another dimension into this problem due to which the pixel or the actuators cannot be open at the target attenuation in a single step. The actuator needs to be opened at a lower attenuation setting than the target actuator settings. Otherwise an overshoot can appear while adding the new channel to the fiber that may cause non-linear interference to the neighboring wavelengths.

Hence in order to respect and overcome all these constraints, conventional systems and methods take few iterations of each WSS to achieve the power target before the wavelength shows up in-service. However due to sequential operation and timing allocation for each WSS in an optical node site, the overall service turn up time for a wavelength over multiple cascaded optical nodes becomes very much significant especially in the case layer 0 (optical layer) restoration schemes. In view of the foregoing, it is desirable to have systems and methods for faster channel additions over multiple cascaded optical nodes utilizing a parallel technique while addressing the aforementioned constraints.

BRIEF SUMMARY OF THE INVENTION

In an exemplary embodiment, a method implemented by a power controller associated with a node in an optical network with one or more sections includes, responsive to adding a channel at the node, performing a power control loop at the node based on power measurements determined at the node, wherein the performing is independent of any other power control loops performed for the channel at one or more additional nodes; and adjusting power of the channel at the node based on the power control loop. The power control loop can be performed without coordination comprising sending messaging between the node and the one or more additional nodes. At least one node of the one or more additional nodes can perform a second power control loop on the channel at the at least one node while the power control loop is performed and there is no coordination between the power control loop and the second power control loop. The power measurements can be per channel power measurements determined at the node. The power control loop can operate based solely on the power measurements determined at the node. The power control loop can be performed in parallel with associated power control loops at the one or more additional nodes as the channel is added to each of the node and the one or more additional nodes. The power control loop can utilize a three state proportional-integral-derivative (PID) control loop with a damped response where a PID response is proportionate to an error term between the power measurements and a set target power to achieve. To avoid any oscillations, a derivative coefficient of the PID response can be set to zero if an overshoot is detected in a previous iteration of the power control loop. The power control loop can run in a close loop receiving constant feedback for the power measurements and performing multiple iterations to ultimately achieve the required target power.

In another exemplary embodiment, a power controller associated with a node in an optical network with one or more sections includes circuitry adapted to, responsive to adding a channel at the node, perform a power control loop at the node based on power measurements determined at the node, wherein the power control loop is performed independent of any other power control loops performed for the channel at one or more additional nodes; and circuitry adapted to cause adjustment of power of the channel at the node based on the power control loop. The power control loop can be performed without coordination through messaging between the node and the one or more additional nodes. At least one node of the one or more additional nodes can perform a second power control loop on the channel at the at least one node while the power control loop is performed and there is no coordination between the power control loop and the second power control loop. The power measurements can be per channel power measurements determined at the node. The power control loop can operate based solely on the power measurements determined at the node. The power control loop can be performed in parallel with associated power control loops at the one or more additional nodes as the channel is added to each of the node and the one or more additional nodes. The power control loop can utilize a three state proportional-integral-derivative (PID) control loop with a damped response where a PID response is proportionate to an error term between the power measurements and a set target power to achieve. To avoid any oscillations, a derivative coefficient of the PID response can be set to zero if an overshoot is detected in a previous iteration of the power control loop. The power control loop can run in a close loop receiving constant feedback for the power measurements and performing multiple iterations to ultimately achieve the required target power.

In a further exemplary embodiment, an optical node includes one or more degrees comprising components configured to selectively alter power of a channel being added to the one or more degrees; an optical power monitor adapted to measure an output power of the channel; and a power controller communicatively coupled to the at least one degree and the optical power monitor, wherein the power controller is configured to, responsive to adding a channel at the node, perform a power control loop at the node based on power measurements determined by the optical power monitor, wherein the power control loop is performed independent of any other power control loops performed for the channel at one or more additional nodes, and cause adjustment of power of the channel by the components based on the power control loop. The power control loop can be performed without coordination through messaging between the optical node and the one or more additional nodes.

BRIEF DESCRIPTION OF THE DRAWING(S)

Exemplary and non-limiting embodiments of the present disclosure are illustrated and described herein with reference to various drawings, in which like reference numbers denote like method steps and/or system components, respectively, and in which.

DETAILED DESCRIPTION OF THE INVENTION

Figure 1:
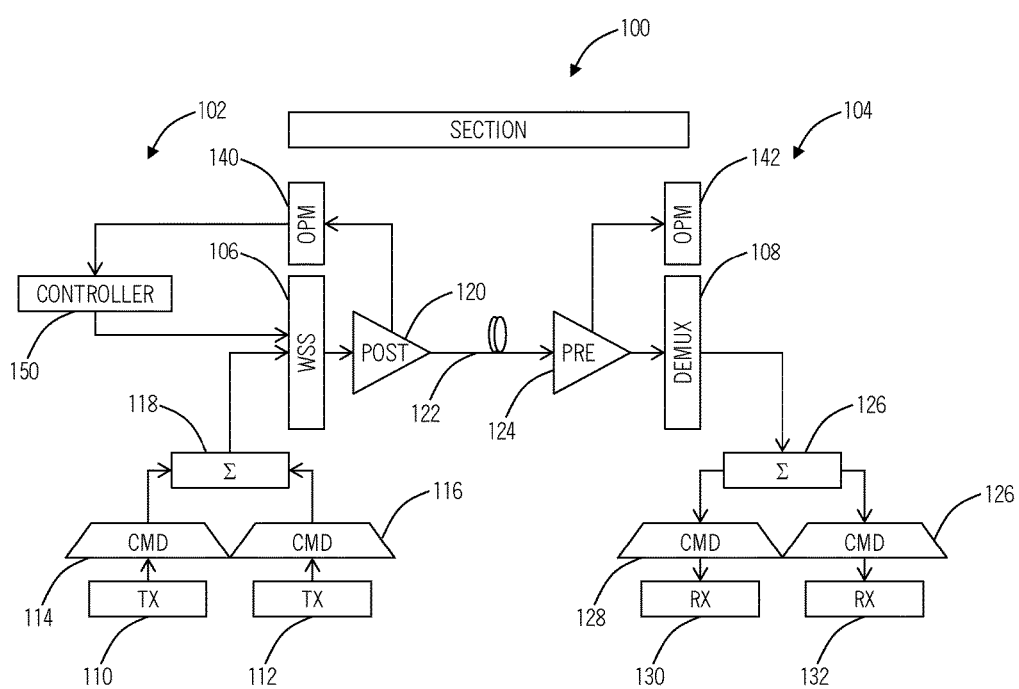
FIG. 1 is a network diagram of a single ROADM section between two ROADM nodes.

In various exemplary embodiments, systems and methods are described for faster channel additions over multiple cascaded optical nodes. The systems and methods are applicable for turning up services in fiber-optic networks, i.e. channel additions, and for rerouting of channels. Variously, the systems and methods include a power controller for an optical node that enables channel additions in parallel over multiple cascaded domains with a significant reduction in overall end-to-end turn up time while preventing overshooting, managing non-linear optic characteristics, and generally maintaining a stable response until convergence to a target. The power controller can implement an algorithm that develops a nodal per channel power that uses a same set of coefficients for each optical node in a system without the necessity of knowing overall system topology or channel traversing paths. Allowing wavelengths to turn up in parallel over multiple cascaded nodes significantly reduces overall service turn up time while having the power controller independent of channel topology is advantageous in a meshed network architecture. The developed power controller allows each downstream node to adapt itself with upstream power changes, and generate a damped unit step response accordingly while still converging to a target that ultimately provides pseudo-parallel convergence to the target from end-to-end. The power controller also helps each optical node to educate itself for any plant related drifts and aging effects (e.g. MEMs based WSS pixel drifts, and pixel offsets due to aging) and taking advantage of that ahead of time accordingly.

As dense wave division multiplexing (DWDM) systems evolve, timing for turning up services is becoming critical especially in the phase of layer 0 restoration schemes. As described herein, the challenge in this case comes along while trying to restore many wavelengths in a path that contains a few number of wavelengths in-service, and the non-linear characteristics of fiber-optics forces to slow down that restoration in order to maintain the traffic and optical signal-to-noise ratio (OSNR) integrity of the in-service wavelengths. In a meshed optical system (i.e., DWDM system) the challenge remains to develop a nodal or per optical channel controller that allows the new service turn-up in a non-service affecting way without having any knowledge of the overall topology of the system or the channel traversing paths. The systems and methods described herein provide the nodal per channel controller that allows turning up wavelengths in cascaded subsystems in a faster and controlled way by adding them in parallel while each controller is utilizing the same set of coefficients and is maintaining OSNR integrity of all the in-service wavelengths. In various descriptions herein, reference is made to a channel which can include, without limitation, a wavelength, a wavelength range, a band of wavelengths, etc.

Advantageously, the systems and methods allow bringing wavelengths in-service in parallel over multiple cascaded optical nodes in a non-service affecting way to other already present in-service wavelengths. The power controller can include a three states proportional-integral-derivative (PID) response (or multi-states in another type of control loop) that avoids any overshoots while adding wavelengths in parallel over multiple cascaded sections. The power controller and associated algorithm adapts for input power variations for a specific wavelength (or channel) while bringing the wavelength in-service that, in turn, allows multiple cascaded downstream controllers to adjust themselves while the upstream controllers are still converging to the target. The algorithm educates itself about WSS pixel drift or any other aging effects over iterations and adapts its response accordingly. The algorithm allows running each power controller on its own independently alleviating any dependency with any upstream or downstream nodes for faster iteration cycles. Since the power controllers run independently, extra messaging between optical nodes is alleviated, i.e., each power controller operates based on its own measurements alleviating dependencies on other power controllers and removing the need for coordination between power controllers. The algorithm allows wavelengths to be turned up in parallel over multiple optical nodes that reduce the service turn up time significantly compared to conventional sequential channel add techniques. With the proposed systems and methods, the turn up time does not go up linearly with the number cascaded optical nodes which will be a significant factor for layer 0 system restoration.

In an exemplary embodiment, a method includes introducing a channel through a first node and a second node, wherein the channel is introduced simultaneously over the first node and the second node; measuring power of the channel entering the first node and the channel entering the second node; determining a first measured error of the channel based on a target power and the measured power at the first node and a second measured error of the channel based on a target power and the measured power at the second node; performing a control loop using the first measured error at the first node and using the second measured error at the second node, wherein the first node and the second node perform the control loop simultaneously and independently of one another, and wherein each of the first node and the second node perform the control loop based only on their own measurements; modifying parameters of the control loop at each of the first node and the second node with a plurality of states to maintain a stable response; and adjusting power of the channel based on the modified control loop at each of the first node and the second node.

The method can further include modifying the control loop at each of the first node and the second node to set a derivative coefficient to zero if an overshoot is detected in a previous iteration of the control loop. The method can further include modifying the control loop at each of the first node and the second node to select coefficients in such a way that a response remains always damped until complete convergence. The method can further include performing the control loop initially at each of the first node and the second node with coefficients selected for a damped unit step response; modifying the control loop at the first node with a first damping factor once absolute magnitude of the first measured error is below a first threshold when the first node is not an ingress node for the channel; modifying the control loop at the second node with the first damping factor once absolute magnitude of the second measured error is below the first threshold when the second node is not an ingress node for the channel; modifying the control loop at the first node with a second damping factor once absolute magnitude of the first measured error is below a second threshold when the first node is not an ingress node for the channel; and modifying the control loop at the second node with the second damping factor once absolute magnitude of the second measured error is below the second threshold when the second node is not an ingress node for the channel.

The method can further include setting a proportional coefficient and an integral coefficient of the coefficients to zero at the first node when the first measured error is below the second threshold; and setting the proportional coefficient and the integral coefficient of the coefficients to zero at the second node when the second measured error is below the second threshold. The method can further include modifying the control loop at the second node with an expected error change offset to dampen a response due to variable input power from the first node. The method can further include determining a first drive offset parameter for each iteration of the control loop to compensate for plant drift and aging effects at the first node; and determining a second drive offset parameter for each iteration of the control loop to compensate for plant drift and aging effects at the second node. The first node and the second node can utilize a same set of parameters and a same set of rules for adjusting the parameters, and wherein the first node and the second node do not communicate with one another with respect to the control loop.

The second node can be downstream from the first node, and wherein the second node utilizes the control loop and associated modifications to adjust the power of the channel while the first node is converging to its target power. The channel can include a first channel, and the method can further include introducing a second channel through the first node and the second node, wherein the second channel is introduced in parallel over the first node and the second node; and performing the measuring, the determining, the performing, the modifying, and the adjusting steps with respect to the second channel independent of the first channel with independent parameters. The method can further include adjusting the power of the channel based on the modified control loop at each of the first node and the second node with any of a wavelength selective switch, a variable optical attenuator, an optical amplifier, and a dynamic gain equalizer. The channel can include any of a wavelength, a group of wavelengths, a range of wavelengths, and a band of wavelengths.

In another exemplary embodiment, an optical node includes at least one degree comprising components configured to selectively alter power of a channel being added to the at least one degree; an optical power monitor measuring an output power of the channel out of the at least one degree; and a power controller communicatively coupled to the at least one degree and the optical power monitor, wherein the power controller is configured to: measure power of the channel being added to the at least one degree, wherein the channel is being added simultaneously over at least one additional node; determine a measured error of the channel based on a target power and the measured power; perform a control loop using the measured error, wherein the at least one additional node performs the control loop simultaneously and independently of the optical node, and wherein each of the optical node and the at least one additional node perform the control loop based only on their own measurements; modify parameters of the control loop with a plurality of states to maintain a stable response; and adjust power of the channel based on the modified control loop using the components to selectively alter the power.

The power controller can be further configured to modify the control loop to set a derivative coefficient to zero if an overshoot is detected in a previous iteration of the control loop. The power controller can be further configured to modify the control loop to select coefficients in such a way that a response remains always damped until complete convergence The power controller can be further configured to perform the control loop initially with coefficients selected for a damped unit step response; modify the control loop with a first damping factor once absolute magnitude of the measured error is below a first threshold when the optical node is not an ingress node for the channel; and modify the control loop with a second damping factor once absolute magnitude of the measured error is below a second threshold when the optical node is not an ingress node for the channel.

The at least one additional node can perform the control loop in parallel with the optical node utilizing a same set of coefficients; and wherein the power controller is further configured to modify the control loop at the optical node with an expected error change offset to dampen a response due to variable input power from the at least one additional node. The power controller can be further configured to determine a drive offset parameter for each iteration of the control loop to compensate for plant drift and aging effects. The channel can include a first channel, and wherein the power controller can be further configured to detect a second channel being added to the at least one degree; and perform the measure, the determine, the perform, the modify, and the adjust steps with respect to the second channel independent of the first channel with independent parameters.

In a further exemplary embodiment, an optical network includes N nodes interconnected therebetween, wherein each of the N nodes comprises: at least one degree comprising components configured to selectively modify power of a channel being added thereto; an optical power monitor measuring a power of the channel at least one degree; and a power controller communicatively coupled to the at least one degree and the optical power monitor; and a channel being added to M nodes of the N nodes simultaneously, M≤N; wherein the power controller at each of the M nodes is configured to measure power of the channel through the at least one degree; determine a measured error of the channel based on a target power and the measured power; simultaneously and independently perform a control loop using the measured error, and wherein each of the M nodes perform the control loop based only on their own measurements; modify parameters of the control loop with a plurality of states to maintain a stable response; and adjust power of the channel based on the modified control loop using the components to selectively alter the power.

Referring to FIG. 1, in an exemplary embodiment, a network diagram illustrates a single ROADM section 100 between two ROADM nodes 102, 104. The ROADM section 100 is between degrees of the ROADM nodes 102, 104, and as described herein, multiple cascaded ROADMs or optical nodes means traversing multiple sections 100. In the exemplary embodiment of FIG. 1, the degree at the ROADM node 102 is formed in part by a WSS 106 and the degree at the ROADM node 104 is formed in part by a demultiplexer 108. Those of ordinary skill in the art will recognize other implementations are also contemplated by the systems and methods described herein. For example, the ROADM node 102 could include a multiplexer and the ROADM node 104 could include a WSS. Alternatively, both the ROADM nodes 102, 104 could include WSSs. Further, other physical implementations are also contemplated for the ROADM nodes described herein besides WSSs, multiplexers, and demultiplexers. That is, the ROADM section 100 with the WSS 106, the demultiplexer 108, and other components is described herein for illustration purposes as one exemplary type of ROADM section. Furthermore, reference is made herein to ROADMs for illustration purposes. Those of ordinary skill in the art will appreciated the systems and methods described herein can apply to any optical spectral adjusting element such as a ROADM, an amplifier site, a dynamic gain equalization site, and the like.

The ROADM node 102 includes transmitters (TX) 110, 112 coupled to channel multiplexers/demultiplexers (CMD) 114, 116. Note, the ROADM node 102 can include any amount of TXs 110, 112. The CMDs 114, 116 are configured to multiplex wavelengths from the TXs 110, 112 and provide to a combiner 118 which combines the outputs from the CMDs 114, 116 into a single input to the WSS 106. In an exemplary embodiment, the CMDs 114, 116 can operate in a range of optical spectrum, e.g. the blue and red ranges, with the TXs 110, 112 being a wavelength in the associated ranges of optical spectrum. The WSS 106 is generally a device receiving the input from the combiner 118 or the like with a number of DWDM wavelengths contained therein along with a plurality of switchable directions in which each of the DWDM wavelengths can be selectively switched thereto. An output of the WSS 106 connects to a post amplifier 120 which can be an erbium doped fiber amplifier (EDFA) or the like. The section 100 includes optical fiber 122 connecting the nodes 102, 104.

At the ROADM node 104, a pre amplifier 124 receives the output of the post amplifier 120. The pre amplifier 124 connects to the demultiplexer 108 which provides the DWDM wavelengths from the node 104 to a splitter 126 which splits the DWDM wavelengths to CMDs 126, 128 which in turn provide individual wavelengths to receivers (RX) 130, 132. For example, the RX 130 is connected to the TX 110 and the RX 132 is connected to the TX 112 via the various components in the ROADM section 100. Note, the splitter 126 and the CMDs 126, 128 basically provide the opposite functionality as the combiner 118 and the CMDs 114, 116. Additionally, both the ROADM nodes 102, 104 include optical power monitors (OPMs) 140, 142 which can tap a small portion of the outputs or inputs to the nodes 102, 104 for monitoring thereof. For example, the OPM 140 can connect to a tap off the post amplifier 120 and the OPM 142 can connect to a tap off the pre amplifier 124. The ROADM node 102 also includes a power controller 150 communicatively coupled to the OPM 140 and the WSS 106. The power controller 150 is configured to run in closed-loop getting an updated optical power reading from the OPM 140 in order to achieve a specific power target at the output of post amplifier 120 through adjustments of the WSS 106. Specifically, the power controller 150 is configured to implement the various systems and methods described herein.

In the ROADM section 100, there could be many ways to add a wavelength in a non-service affecting way to other in-service wavelengths already present over the optical fiber 122. The simplest possible way is to open a pixel in the WSS 106 with an estimated target attenuation to achieve the same launch power as the other in-service wavelengths. However opening WSS pixels in open loop (since before opening up the pixel, there is no light ending up in the OPM 140, and hence no feedback) may not be accurate and often ends up with an overshoot or undershoot then the desired launch power. Hence a simple control loop by the power controller 150 is required to run externally that will monitor the offset or error from the target by measuring the feedback from the OPM 140, and will try to compensate for that accordingly. The power controller 150 could be a PI-(proportional-integral) or a simple I-(integral) controller. Hence adding a wavelength through the single WSS 106 over the single ROADM section 100 is relatively easier to achieve. Note, the WSS 106 is described herein as an exemplary power adjusting device with respect to the channel. Those of ordinary skill in the art will recognize the systems and methods described herein contemplate other devices for channel power adjustments such as, without limitation, variable optical attenuators, optical amplifiers, dynamic gain equalizers, etc.

Figure 2:
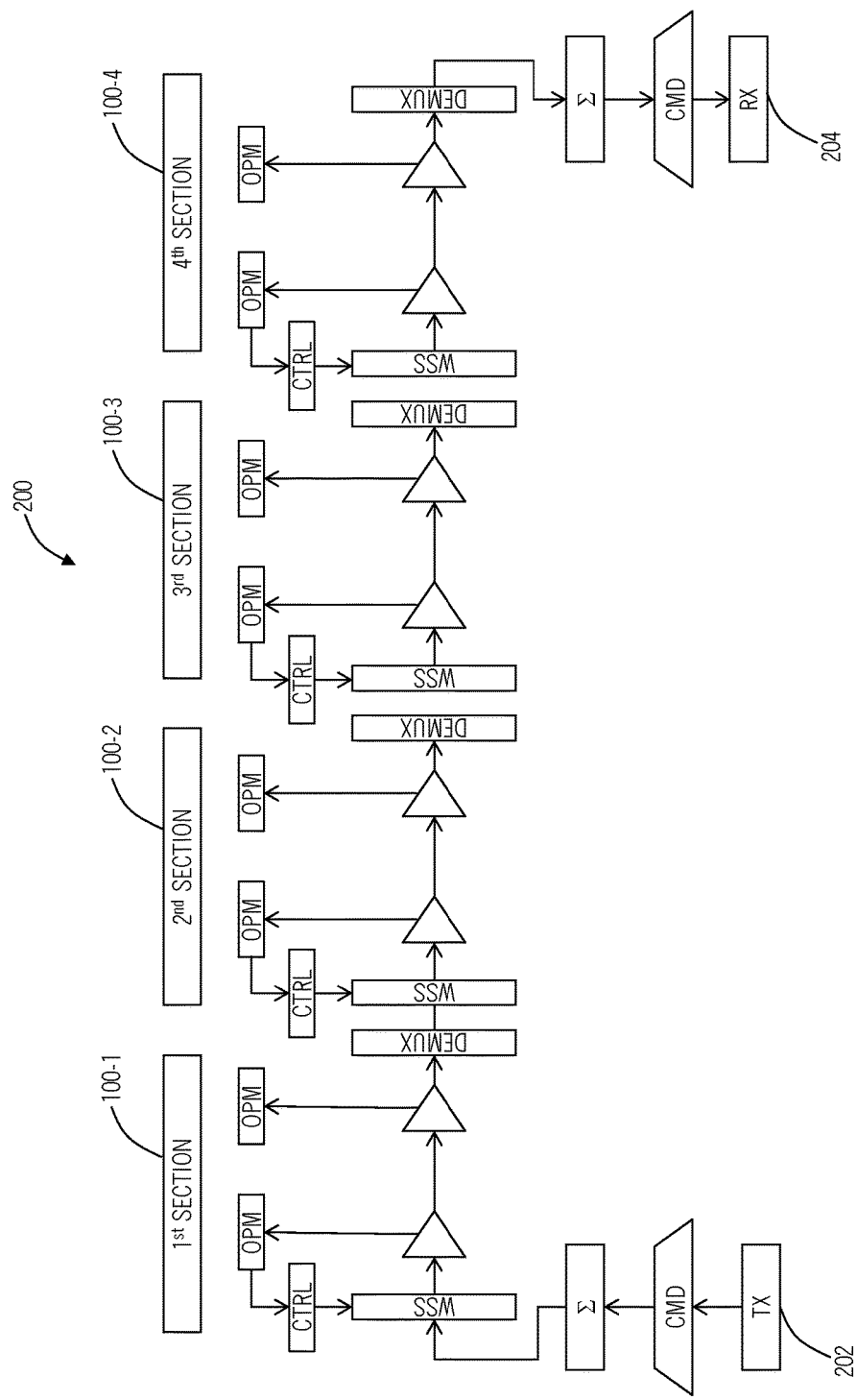
FIG. 2 is a network diagram of a network of four linearly cascaded ROADM sections.

Referring to FIG. 2, in an exemplary embodiment, a network diagram illustrates a network 200 of four linearly cascaded ROADM sections 100-1, 100-2, 100-3, 100-4. Each of the linearly cascaded sections 100-1, 100-2, 100-3, 100-4 can include components described in FIG. 1 with respect to the ROADM section 100. In an exemplary embodiment, the network 200 can include a TX 202 which ultimately will connect to a RX 204 over the linearly cascaded sections 100-1, 100-2, 100-3, 100-4. For example, the TX 202 and the RX 204 can include a 40 Gb/s wavelength in between 1530 to 1565 nm. Conventionally, in order to add a wavelength or channel from the TX 202 over the cascaded sections 100-1, 100-2, 100-3, 100-4, a simple idea is to add them in sequence, that is, starting the add in a downstream WSS section in only when the upstream is completed with its add operation. For example, the section 100-2 does not begin until the section 100-1 is complete. In such case, the same control loop can be in operation for each WSS in each of the sections 100-1, 100-2, 100-3, 100-4, and are able to add the channel as soon as upstream is done with add. As described herein, this process is too time consuming and the timing to turn up new wavelengths grows up linearly with the number of traversed sections 100-1, 100-2, 100-3, 100-4. Each section 100-1, 100-2, 100-3, 100-4 also has to be aware of the channel topology to know about upstream and downstream controllers and the process becomes complicated while operating in complete meshed environment.

Figure 3:
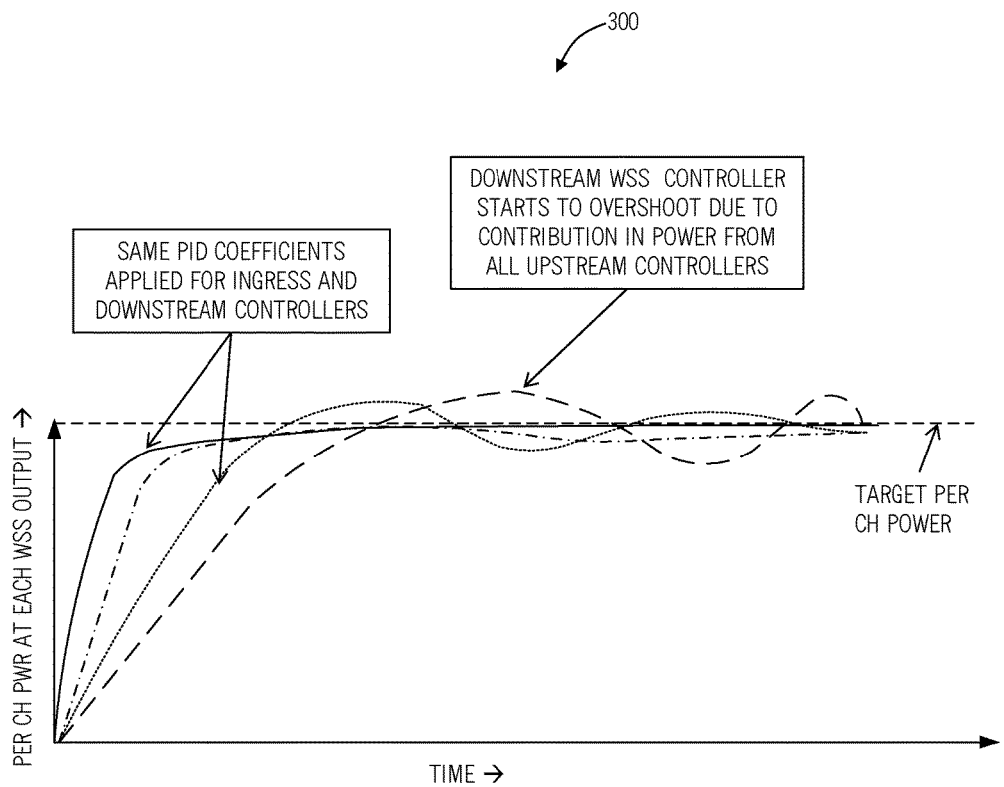
FIG. 3 is a graph showing an example of overshoot in conventional systems and methods.

In order to reduce the timing, it is possible to add the optical channels or wavelengths in parallel over multiple sections 100-1, 100-2, 100-3, 100-4 using a damped power controller for control of the WSSs 106 where a power target is provided to the controller instead of a fixed target loss or attenuation. The target attenuation based loss controllers are not feasible in this case as a steady attenuation cannot be set as target unless the controllers are acting in sequence. It is possible to develop a PID (proportional-integral-derivative) power controller for the WSS 106 with a damped unit step response in order to make sure that no overshoot appears during channel add. The target power can be set as the power required to achieve at the output of the WSS 106, while the power delta between the target and the measured can be served as the measured error amount based on which the power controller can act. However with this power controller approach, the problem starts when the controllers, running for each of those WSSs 106 installed in cascade, run in parallel and are trying to achieve their own target output power per channel with the same unit step response. If each of the downstream controllers applies the same unit step response at same cadence, the channels to be added are soon going to overshoot by significant amount due to rapid change in input powers since the upstream controllers are converging at the same time. Such overshoot may cause serious non-linear interference to the neighboring in-service wavelengths. FIG. 3 is a graph 300 showing an example of such overshoot appearance where the time variant response from each cascaded controller is plotted to show that regardless of how damped the power controller response is designed for a single WSS controller, the downstream controllers will soon start to overshoot due to the contribution in power from all upstream controllers. Another inherited problem with PID controllers is the oscillations that will soon start to appear once an overshoot takes place making the state of the wavelength unstable for a while. This is one reason why previous designs often considered PI- or simple I-controller rather than taking the full advantage of a PID controller.

In order to avoid overshoots, one approach is to damp the controller response by a factor of N where N is the number of upstream controllers in cascade. However, it is hard to estimate the number of upstream controllers especially when multiple channels will be added traversing from multiple ingress points and from different distances into a mesh network, and each per channel controller will then have to apply their own proportional factor to damp their response accordingly. This solution also require extra messaging for each channel to notify each controller about the number of upstream controllers each has for each channel. As described herein, the plant related drifts and aging effects (e.g. MEMs based WSS pixel drifts, and pixel offsets due to aging) adds a new dimension to the problem due to which each controller fails to respond accordingly to the required attenuation and power changes. The plant related drifts could move in positive or in negative direction that means for a required attenuation change, the WSS could provide more or less to the target (depending on how the pixel drifted) and such drift phenomenon could vary for different input switch ports for the same pixel in the same WSS. Due to such uncertainty, the controller always needs to be run in close loop control getting constant feedback on measured power and taking multiple iterations to ultimately achieve the required target power.

Accordingly, the systems and methods described herein propose an algorithm running on the controller 150 for controlling the response of each ROADM section 100 adding a new wavelength in parallel. The algorithm allows a controlled way of adding wavelengths in parallel over the multiple cascaded sections 100-1, 100-2, 100-3, 100-4. As the input power changes due to upstream controller 150 convergence, each of the controllers 150 adapts its response accordingly and run independently alleviating the need for any extra messaging. The controller 150 self-educates and adapts its response accordingly for any plant related drifts that mitigates any dependency on any hardware variances. The designed controller 150 allows using the same coefficients and same vertical model for all channels making it a perfect fit for all of the sections 100-1, 100-2, 100-3, 100-4 running in a meshed network environment. Since the wavelengths are turned up in parallel, the service turn up time get reduced significantly and does not go up linearly with the number cascaded sections 100-1, 100-2, 100-3, 100-4.

The network 200 shows a linearly cascaded ROADM sections 100-1, 100-2, 100-3, 100-4 for illustration purposes. Those of ordinary skill in the art will recognize that optical networks can include tens or hundreds of ROADM nodes 102, 104 forming complex, mesh interconnected segments 100 with various DWDM wavelengths traversing each section 100 possibly having different ingress and egress locations (i.e., A-Z). The systems and methods described herein with the power controller 150 contemplate use in such networks. In fact, due to the topology agnostic aspects of the power controller 150, the systems and methods are advantageous in not requiring topology or path knowledge of a wavelength while adding it to the network.

Figure 4:
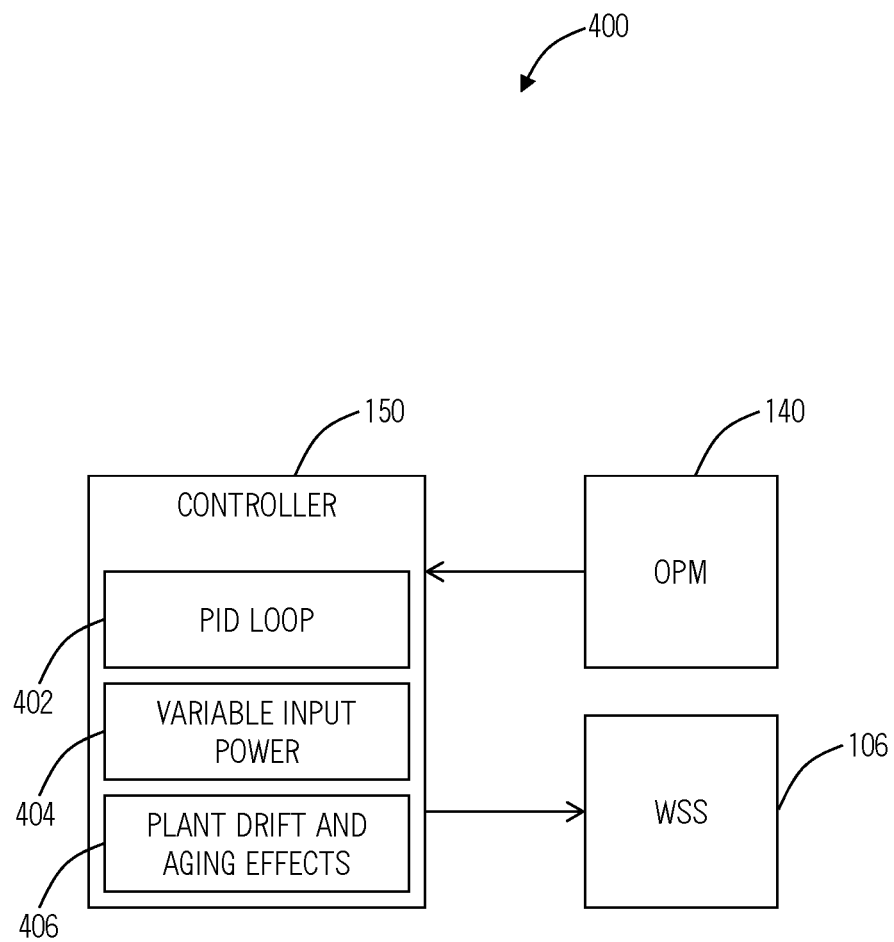
FIG. 4 is a block diagram of a power controller system for adding a channel in parallel over multiple cascaded ROADM sections.

Referring to FIG. 4, in an exemplary embodiment, a block diagram illustrates a power controller system 400 for adding a channel in parallel over multiple cascaded ROADM sections. The power controller system 400 includes the OPM 140 providing per channel power measurements to the power controller 150 and the power controller 150 implementing an algorithm for determining power settings for the added channel on the WSS 106. Again, since the power controllers 150 do not coordinate with one another such as through messaging, the determined power settings are based on the per channel power measurements at each node. Again, as described herein, the WSS 106 is one exemplary ROADM device contemplated for use with the power controller 150. Other hardware implementations are also contemplated including any optical devices for ROADM implementation that allow for variable per channel power settings by the power controller 150.

The ROADM nodes have degrees. Each degree represents an ingress and/or egress point for the ROADM node 102, 104. As described herein, the degree can be formed in part by the WSS 106 and/or the demultiplexer 108. Of course other configurations and hardware is contemplated. The systems and methods described herein with respect to the power controller 150 and the power controller system 400 provide an optimized way to quickly determine a target power of a channel (i.e., wavelength) being added to a network. Generally, the systems and methods determine attenuation settings for the channel egressing a ROADM degree at the node where the power controller system 400 is located. This can include setting pixel values of the WSS 106. Of course, the WSS 106 can be generally described as a ROADM degree in which the wavelength being added can be selectively attenuated by the power controller 150 and the power controller system 400 based on the methods described herein. The power controller 150 is a processing device configured to implement the algorithm which generally includes a PID loop 402, a mechanism for handing variable input power 404, and a mechanism for adapting to plant drift and aging effects 406.

In an exemplary embodiment, a response of the power controller 1500 in each WSS iteration cycle is determined by the following equation:

$$d_t^s = (1 - k_s)d_t^m - \left(k_p * e_t^m + k_I * \sum_t (e_t^m * \Delta t) + k_d * \frac{\Delta}{\Delta t}(e_t^m) + k_e * (|\Delta e_t^x| - |\Delta e_{t-1,t}^m|)\right) + k_s * d_{t-1}^s$$

Where:
- $d_t^s$ refers to the pixel drive value set in controller iteration cycle t
- $d_t^m$ refers to the measured drive or attenuation in WSS iteration cycle t that is estimated as input minus output minus the insertion loss at WSS mux port
- $e_t^m$ refers to the measured error in cycle t that is the delta between target power and measured power at WSS mux output
- $\Delta e_t^x$ defines the expected error change in iteration cycle t that is also same as the PID response applied in previous iteration cycle (t−1)
- $\Delta e_{t-1,t}^m$ refers to the measured error change between previous and current iteration cycle
- $d_{t-1}^s$ stands for the pixel drive value set in previous WSS iteration cycle (t−1), and
- $k_p$, $k_I$, $k_d$ refer to PID control coefficients
- $k_s$, and $k_e$ are the coefficients used for considering WSS pixel drift and input power variation into account The foregoing equation allows adding wavelengths in parallel over multiple cascaded segments using the PID loop 402, the mechanism for handing variable input power 404, and the mechanism for adapting to plant drift and aging effects 406.

For the PID loop 402, the power controller 150 internally uses a three state PID control loop with damped response where the PID response is proportionate to an error term between the measured power from the OPM 140 and a set target power to achieve. At start of the iteration, the power controller 150 retrieves a Target Power at the WSS 106 output, a scaled value from amplifier target peak power, i.e. the target launch power for that wavelength to fiber, and also the Measured Power at the WSS 106 output that is a scaled power value measured from the OPM 140. The PID proportionate is estimated as described below (starting from iteration denoted as "iter" from 0) where it includes a proportional, integral and derivative term of the existing error, or power delta to reach.

In order to avoid any oscillations on the power controller 150 response which is an inherited problem of PID controllers, the derivative coefficient is set to zero if an overshoot is detected in the previous iteration. Hence if any time an overshoot takes place, the power controller 150 converges to a damped PI controller in order to avoid oscillations on the power controller response. The PID loop 402 can include the following computations to determine the P, I, and D values for each iteration, iter:

MeasuredErr[iter]=WSSMuxOutTargetPower−WssMuxOutMeasPwr[iter]

P[iter]=Kp*MeasuredErr[iter];

I[iter]=Ki*ΣMeasuredErr[iter]*dT

I[iter]=Ki*{MeasuredErr[iter]+MeasuredErr[iter−1]+ . . . +MeasuredErr[0]}*dT

I[iter]=Ki*MeasuredErr[iter]*dT+Ki*{MeasuredErr[iter−1]+ . . . +MeasuredErr[0]}*dT I[iter]=Ki*MeasuredErr[iter]*dT+I[iter−1];

D[iter]=Kd*(1/dT)*(MeasuredErr[iter]−MeasuredErr[iter−1]);

if(iter>0)&&(MeasuredErr[iter−1]<0),D[iter]=0.0;

Tmp_Err[iter]=P[iter]+I[iter]+D[iter];

Specifically, the measured error, MeasuredErr [iter], is computed as the difference between target output power and measured output power. The proportional value, P[iter], equals a proportional coefficient, Kp, times the measured error. The integral value, I[iter], equals an integral coefficient, Ki, times the integral of all previously measured errors. The integral value works out to equal the integral coefficient times the measured error, MeasuredErr [iter], times dT plus the previous integral value, I[iter−1]. The value dT can be a time amount related to the iteration, iter. The derivative value, D[iter], equals a derivative coefficient, Kd, times 1/dT times the difference between the measured error, MeasuredErr [iter], and the previously measured error, MeasuredErr [iter−1]. Furthermore, the derivative value, D[iter], is set to zero if the iteration is greater than zero (i.e., not the first iteration) and the previously measured error, MeasuredErr [iter−1], is less than zero. The temporary error correction value, Tmp_Err[iter] equals the proportional value, P[iter], plus the integral value, I[iter], plus the derivative value, D[iter]. In terms of notations, this temporary error correction value is:

$$tmp_t = P_t + I_t + D_t = k_p * e_t^m + k_I * \sum_t (e_t^m * \Delta t) + k_d * \frac{\Delta}{\Delta t}(e_t^m) \quad (1)$$

Based on absolute magnitude of errors, the three states for the power controller 150 is defined where the coefficients Kp, Ki, and Kd are chosen in a such a way that the power controller 150 response remains always damped until complete convergence. To start up the power controller 150 from dark to add a wavelength, all three coefficients exist chosen for a damped unit step response. Once the error becomes lower (<3 dB), a damping factor is applied in all downstream power controllers 150 with the controller response to make them further damped in order to avoid unwanted overshoots while all the upstream power controllers 150 are converging at the same time. If the absolute value of error becomes less than 0.5 dB, the coefficients Kp and Kd are set to 0 (zero) and Ki to a small value effectively transferring the PID loop to a slow integral controller to proceed to final convergence (abs($e_t^m$)→0 dB) avoiding any other system measurement errors. Hence the repose of the PID controller as described in equation (1) above gets updated as below:

State 1: If abs(MeasuredError[iter])>3 dB,
damping_factor=1.0;

State 2: If abs(MeasuredError[iter])≤3 dB,
damping_factor=0.5;

State 3: If abs(MeasuredError[iter])≤0.5 dB,
Kp=0.0; Kd=0.0; damping_factor=2.5;

Tmp_Error[iter]=P[iter]+I[iter]+D[iter]; // from equation (1)

Tmp_Error[iter]=Tmp_Error[iter]*damping_factor; (2)

Note that the above changes are not applied to an ingress power controller's 150 PID response in order to achieve fastest possible convergence. For example, the ingress power controller 150, in the exemplary embodiment of FIG. 2 is the power controller 150 in the section 100-1. To maintain the damped response and to avoid any unnecessary oscillations, a forward sequence among the three states of the controller is always maintained.

With respect to the mechanism for handing variable input power 404, in order to run all the cascaded power controllers 150 with the same unit step response (i.e. same PID coefficients for all of the power controllers 150) and to initiate a parallel add over multiple cascaded ROADMs at the same time, the first challenge comes along is the variation in input power for the downstream power controllers 150 while the upstream power controllers 150 are still converging. If the downstream power controllers 150 start ramping up at the same time, they will soon start to overshoot due to the contribution in power from all upstream power controllers 150 even if the unit step response is made very much damped in the PID loop 402. To cope with dynamic input power change, an "Expected-Error-Change-Offset" is adapted with each PID response that helps to dampen the response further for downstream power controllers 150 as follows:

Expected_Error_Change[iter]=Tmp_Error[iter−1];

Meas_Error_Change[iter]=MeasuredError[iter−1]−MeasuredError[iter];

Error_Offset[iter]=abs(Expected_Error_Change[iter])−abs(Meas_Error_Change[iter]);

Error_Offset[iter]= Error_Coefficient_Ke*Error_Offset[iter]

In terms of notations, $$e_t^{offset} = k_e * (|\Delta e_t^x| - |\Delta e_{t-1,t}^m|) \quad (3)$$

The estimated Error_Offset is then adjusted to derive the new attenuation settings for the WSS 106 pixels for the channels to add. The attenuation parameter on the WSS is often referred as "Drive".

Drive_Offset[iter]=Tmp_Error[iter]+Error_Offset[iter];

Meas_Drive[iter]=WSSMuxInput[iter]−WssMuxOutMeasPwr[iter]−WSSMuxCCT_Loss;

Set_Drive[iter]2=Meas_Drive[iter]−Drive_Offset[iter];

In terms of notations and combining with equations (1) and (3), $$d_t^{s2} = d_t^m - (tmp_t + e_t^{offset}) \quad (4)$$

$$= d_t^m - \left(k_p * e_t^m + k_I * \sum_t (e_t^m * \Delta t) + k_d * \frac{\Delta}{\Delta t}(e_t^m) + k_e * (|\Delta e_t^x| - |\Delta e_{t-1,t}^m|)\right)$$

The damping factor term as described in equation (2) is inherited within controller coefficients Kp, Ki, and Kd and is not shown in derivation. In summary, the controller defines the actuator change applied in the previous iteration as the "expected error change" for the current iteration, and compares that with the measured output response delta (from its own feedback loop) between the present and the previous iterations. If the measured output response delta is more or less than the expected change, the controller realizes that the input can possibly be varied by other controllers in upstream, and hence, adapts its response accordingly. This is the key part of the algorithm that helps the controller to stabilize its response even if the upstream controllers are trying to control the same signal at the same time, which in turn helps the controller maintain the stability without knowing the overall system topology or channel traversing paths.

With respect to the mechanism for adapting to plant drift and aging effects 406, the power controller 150 adds another fraction of error on top of its provisioned or applied drive settings regardless of the input power it receives. For example, if a WSS pixel for a specific switch port is drifted or calibrated for 10% drift which means if a 10 dB target attenuation change is applied for that pixel, it may move by 9 dB or 11 dB from its current settings based on which way it is drifted. If the pixel is moved from one input switch position to another, the associated drift may alter as well.

The problem becomes more significant if cascaded power controllers 150 start swinging in different drift directions (e.g. one goes in positive and the downstream goes in negative drift on top of their input power variation). To partially cope with the drift, a drive offset parameter is adapted with each PID response as below:

Prev_Set_Drive=Set_Drive[iter−1];

Current_Meas_Drive=Meas_Drive[iter];

Drive_Drift_Offset=Prev_Set_Drive−Current_Meas_Drive;

Applied_Drive_Drift_Offset=Drift_Coefficient_Ks*Drive_Drift_Offset;

if(MeasuredError[iter−1]<0)Applied_Drive_Drift_Offset=0.0;

Set_Drive[iter]=Set_Drive[iter]2+Applied_Drive_Drift_Offset;

In terms of notations, $$d_t^s = d_t^{s2} + k_s * \text{drift}_t^{\text{offset}} \quad (5)$$
$$= d_t^{s2} + k_s * (d_{t-1}^s - d_t^m)$$

Combining equation (5) with equation (4), the overall drive response can be written as:

$$d_t^s = d_t^m - \left(k_p * e_t^m + k_I * \sum_t (e_t^m * \Delta t) + k_d * \frac{\Delta}{\Delta t}(e_t^m) + k_e * (|\Delta e_t^x| - |\Delta e_{t-1,t}^m|)\right) + k_s * (d_{t-1}^s - d_t^m)$$

$$= (1 - k_s)d_t^m - \left(k_p * e_t^m + k_I * \sum_t (e_t^m * \Delta t) + k_d * \frac{\Delta}{\Delta t}(e_t^m) + k_e * (|\Delta e_t^x| - |\Delta e_{t-1,t}^m|)\right) + k_s * d_{t-1}^s$$

Figure 5:
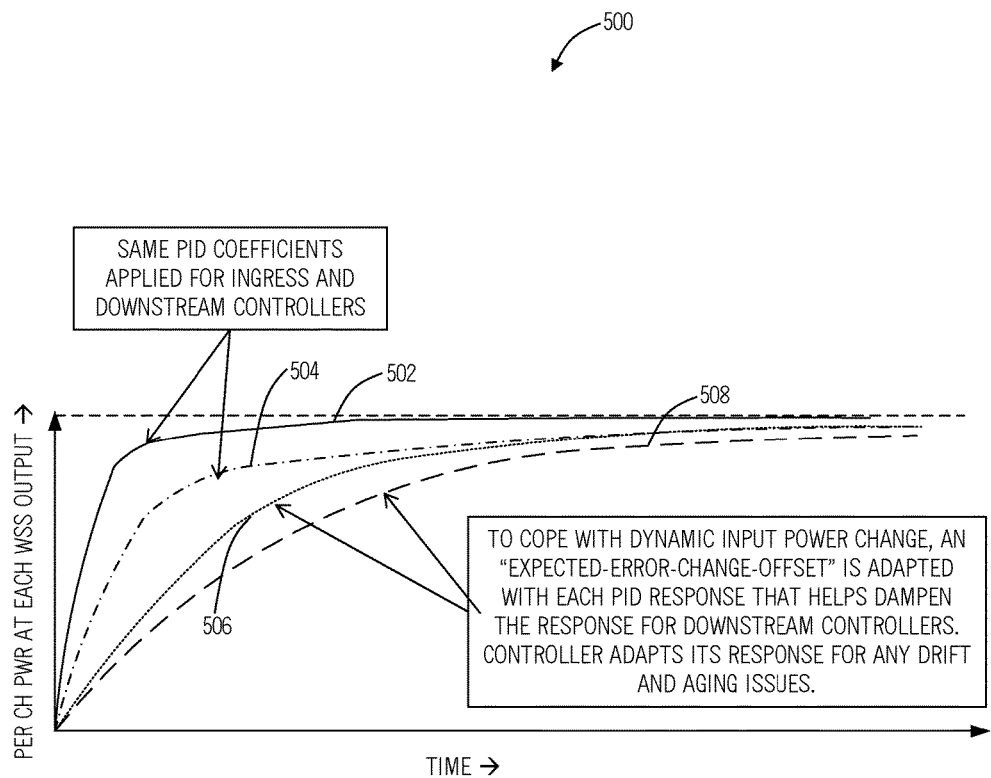
FIG. 5 is a graph of a time variant response of cascaded power controllers while adding a channel in parallel using the proposed algorithm of the power controller system of FIG. 4.

Referring to FIG. 5, in an exemplary embodiment, a graph 500 illustrates time variant response of cascaded power controllers 150 while adding a channel in parallel using the proposed algorithm of the system 400. The graph 500 depicts the desired response in terms of per channel optical power while bringing up a wavelength in-service over multiple cascaded ROADMs (WSS) in parallel. Specifically, referring to the network 200, line 502 relates to the response in the section 100-1, line 504 relates to the response in the section 100-2, line 506 relates to the response in the section 100-3, and line 508 relates to the response in the section 100-4. As can be seen by the downstream power controllers 150, i.e. in the sections 100-3, 1004, dynamic input power changes are dealt with using the mechanism for handing variable input power 404 and drift and aging are dealt with using the mechanism for adapting to plant drift and aging effects 406. A comparison of FIG. 5 with the conventional systems and methods shown in FIG. 3 shows quicker convergence and no overshooting.

Figure 6A:
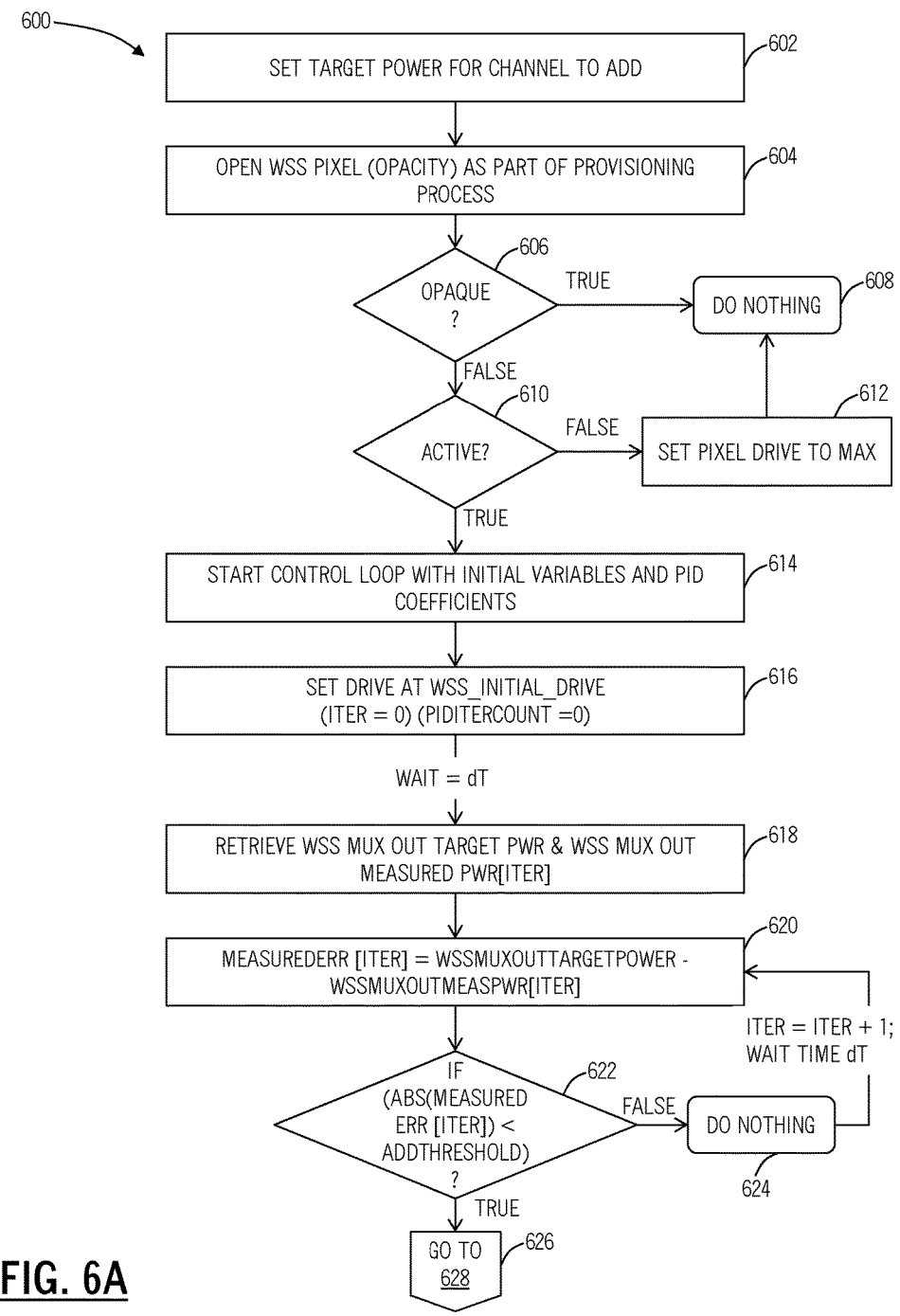
FIGS. 6A-6E are a flowchart of a power controller method of a complete WSS iteration cycle running on a power controller.
Figure 6B:
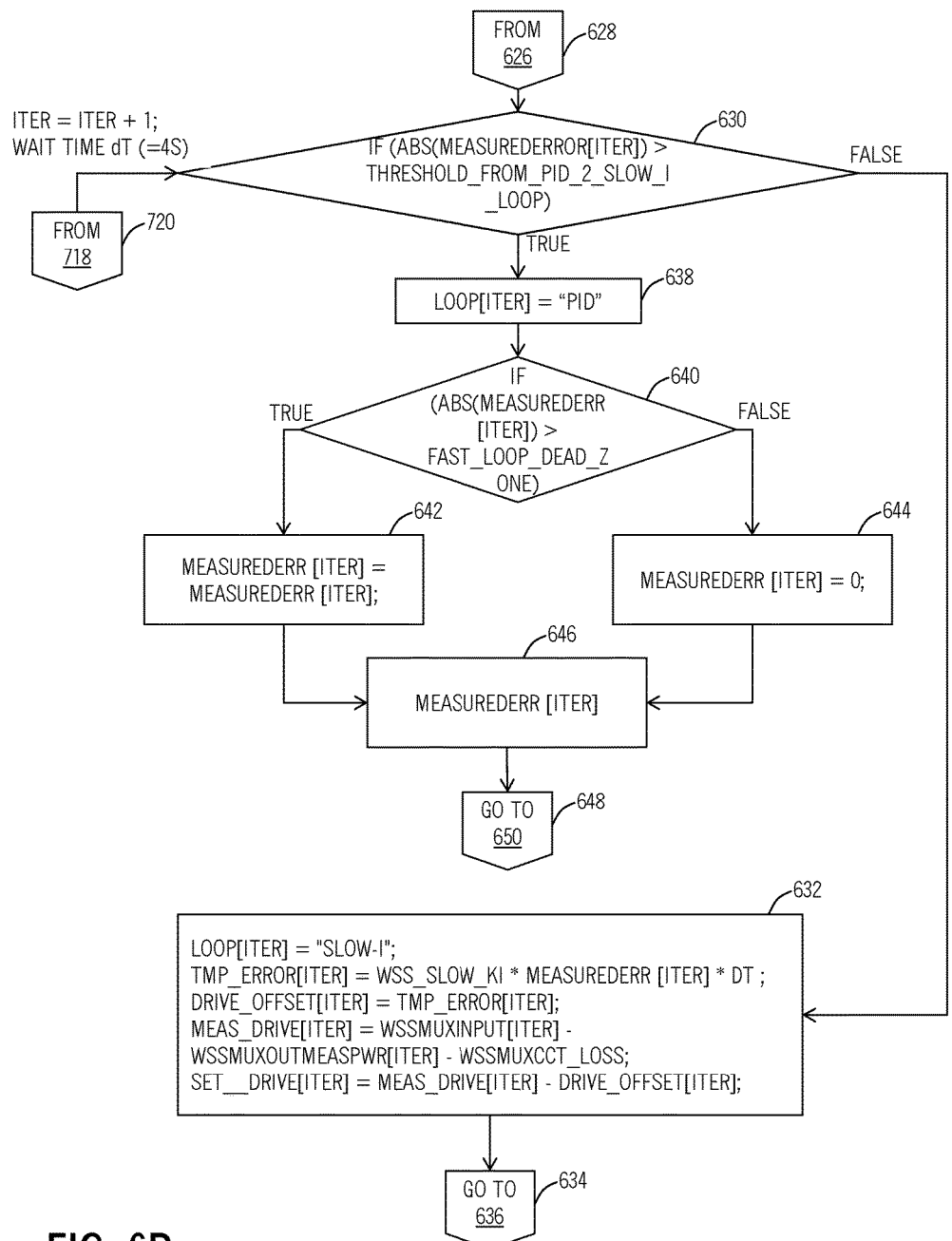
Figure 6C:
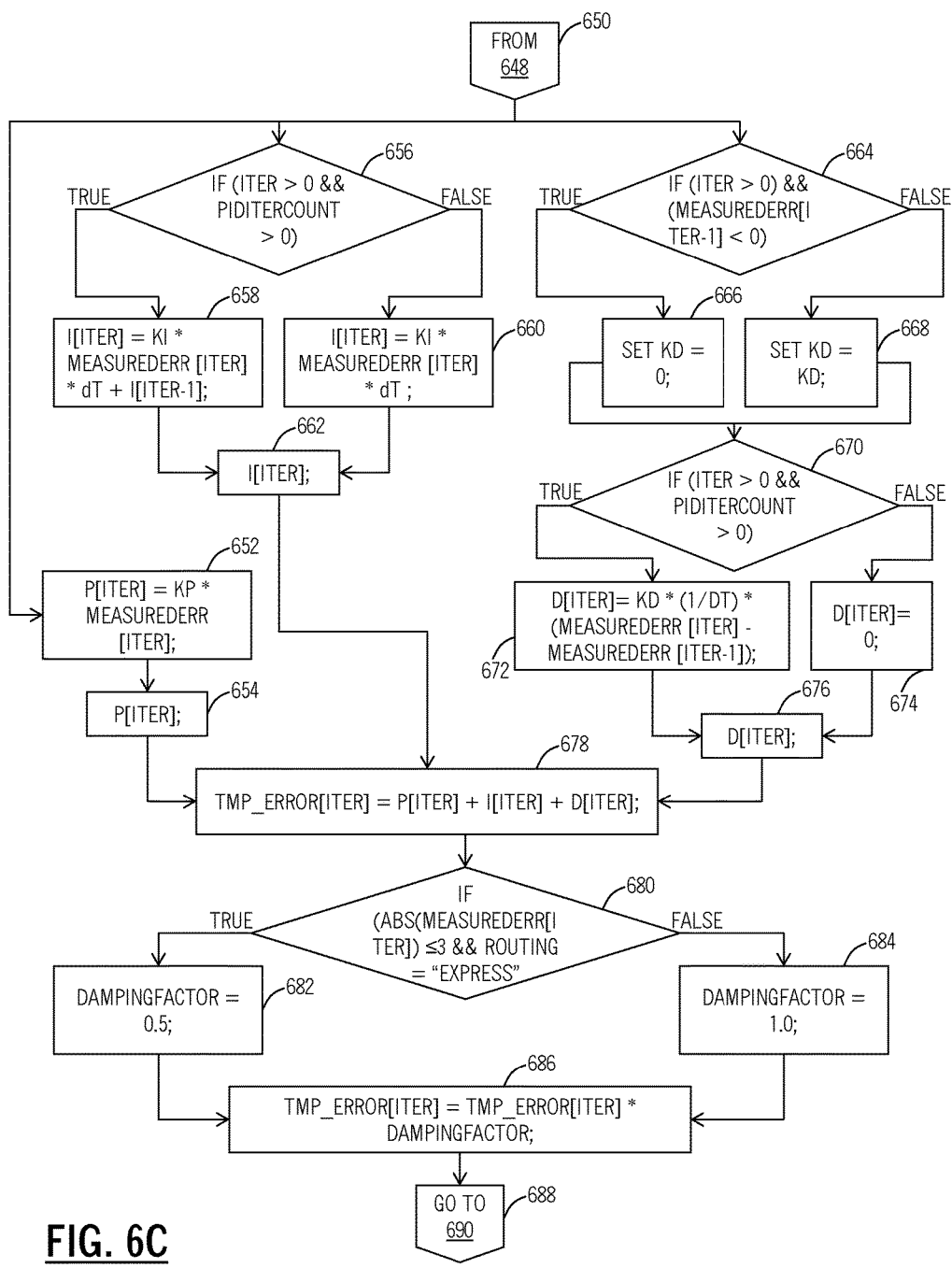
Figure 6D:
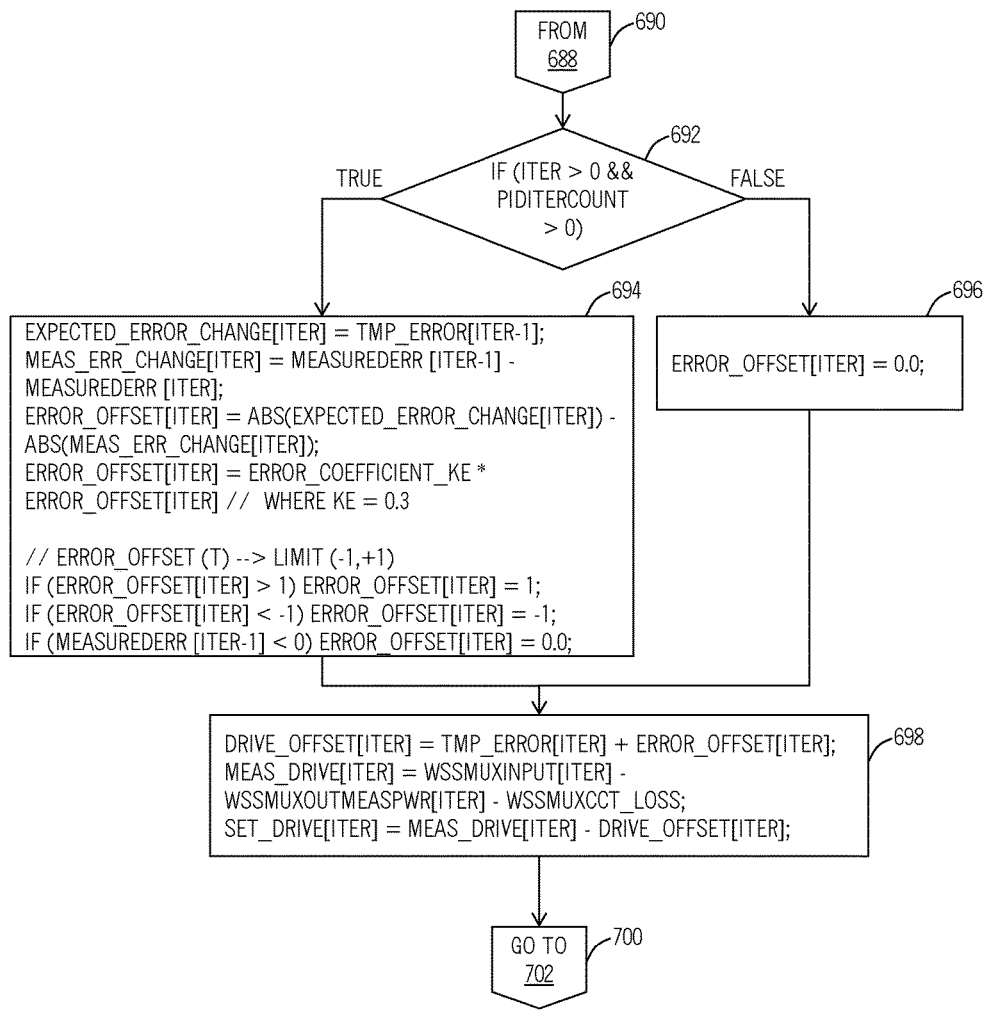
Figure 6E:
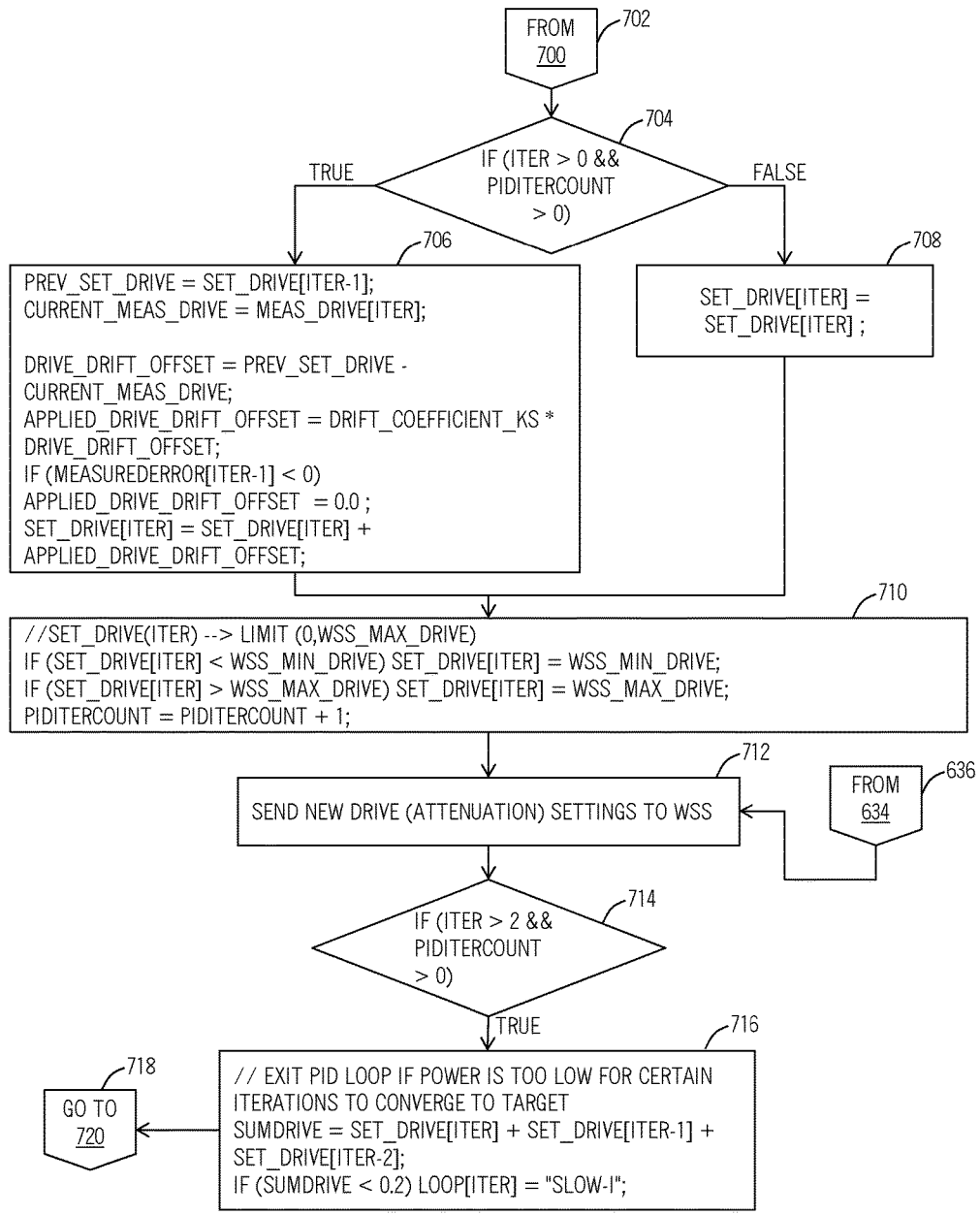

Referring to FIGS. 6A-6E, in an exemplary embodiment, a flowchart illustrates a power controller method 600 of a complete WSS iteration cycle running on the power controller 150. In an exemplary embodiment, the power controller method 600 can be implemented in the power controller system 400 and the like. The power controller method 600 begins responsive to a request to add a new channel, i.e. wavelength, at the ROADM node in which the power controller method 600 is operating. In FIG. 6A, the power controller method 600 sets a target power for the channel being add (step 602). The target power can be based on various considerations such as amplifier gain, number of channels, channel type, etc. The target power represents the goal for the power controller method 600 to set the channel at in the ROADM node. The power controller method 600 opens an associated WSS pixel as part of a provisioning process (step 604). As described herein, the power controller method 600 operates at the ROADM node independently and in parallel with other ROADM nodes also operating the power controller method 600. If the WSS pixel is opaque (step 606), there is nothing for the power controller method 600 to do (step 608). If the WSS pixel is not active (step 610), the power controller method 600 can set the pixel drive to max (step 612).

If the WSS pixel is active and not opaque (steps 610, 606), then the power controller method 600 can start a control loop with initial variables and PID coefficients (step 614). For example, the initial variables can include, without limitation, WSS_Initial_Drive which is an attenuation parameter on the WSS; AddThreshold=WSS_Initial_Drive+Hysteresis; Threshold_From_PID_2_Slow_I_Loop; slow loop dead zone; fast loop dead zone; etc. For example, the PID coefficients can include, without limitation, Kp=0.55; Ki=0.01; Kd=−0.52; a PID coefficients for the Slow-I Loop of Slow_Ki=0.1/4; dT=4 s for an WSS Scan Rate or Iteration cycle of 4 s; Error_Coefficient_Ke=0.3; Drift_Coefficient_Ks=0.7; DampingFactor; WSS_Min_Drive; WSS_Max_Drive; etc. The power controller method 600 sets the drive at the WSS pixel at the WSS_Initial_Drive value, sets Iter=0, and PIDIterCount=0 (step 616). The power controller method 600 waits dT time, i.e. 4 s. The power controller method 600 retrieves WSS mux out target power and WSS mux out measured power[Iter] (step 618). The power controller method 600 computes MeasuredErr[Iter] as the difference between the WSS mux out target power and the WSS mux out measured power[Iter] (step 620).

The power controller method 600 checks in the computed MeasuredErr[Iter] is less than an AddThreshold value (step 622), and if so, the power controller method 600 can halt (step 624) and optionally return to the step 620 every dT time. If the computed MeasuredErr[Iter] is greater than or equal to the AddThreshold value (step 622), the power controller method 600 goes to step 628 in FIG. 6B (step 626). From step 628, the power controller method 600 checks if the MeasuredErr[Iter] is greater than a Threshold_From_PID_2_Slow_I_Loop value (step 630). The step 630 determines what type of PID loop is performed. If the MeasuredErr[Iter] is less than or equal to the Threshold_From_PID_2_Slow_I_Loop value (step 630), the power controller method 600 performs a slow-I iteration (step 632). The step 632 includes computing Tmp_Error[Iter]=Wss_Slow_Ki*MeasuredErr[Iter]*dT, setting the Drive_Offset[Iter]=Tmp_Error[Iter], setting the Meas_Drive[Iter]=WssMuxInput[Iter]−WssMuxOutMeasPwr[Iter]−WssMuxCCT_Loss, and setting Set_Drive[Iter]=Meas_Drive[Iter]−Drive_Offset[Iter]. The power controller method 600 goes to step 636 in FIG. 6E (step 634).

If the MeasuredErr[Iter] is greater than the Threshold_From_PID_2_Slow_I_Loop value (step 630), the power controller method 600 performs a standard PID loop (step 638). The power controller method 600 checks if the MeasuredErr[Iter] is greater than a fast loop dead zone value (step 640). If so, the power controller method 600 sets MeasuredErr[Iter] as the previously determined value (step 642), otherwise the MeasuredErr[Iter] is set to 0 (step 644). From this, the power controller method 600 has a value for MeasuredErr[Iter] (step 646) and proceeds to step 650 in FIG. 6C (step 648). From the step 650, the MeasuredErr [Iter] is provided to three separate computations that compute the P, I, and D terms. First, P[Iter]=Kp*MeasuredErr [Iter] (step 652) providing a value for P[Iter] (step 654). The power controller method 600 checks if the Iter value and PIDIterCount are greater than 0 (step 656). If so, I[Iter]= Ki*MeasuredErr[Iter]*dT+I[Iter−1] (step 658), otherwise I[Iter]=Ki*MeasuredErr[Iter]*dT (step 660) and the power controller method 600 has a value for I[Iter] (step 662).

The power controller method 600 checks if the Iter value is greater than 0 and the MeasuredErr[Iter−1] is less than 0 (step 664). If so, Kd is set to 0 (step 666), otherwise Kd=Kd (step 668). The power controller method 600 checks if the Iter value and PIDIterCount are greater than 0 (step 670). If so, D[Iter]=Kd*1/dT*(MeasuredErr[Iter]−MeasuredErr [Iter−1]) (step 672), otherwise D[Iter]=0 (step 674) and the power controller method 600 has a value for D[Iter] (step 676). The power controller method 600 sets Tmp_Error [Iter]= P[Iter]+I[Iter]+D[Iter] (step 678). The power controller method 600 checks if the MeasuredErr[Iter] is less than 3 (i.e., a certain determined threshold value) and that the routing of the channel is express (i.e., the channel is not added or dropped at this ROADM node performing the power controller method 600) (step 680). If so, the power controller method 600 sets a damping factor=0.5 (step 682), otherwise the damping factor=1 (step 684). The Tmp_Error [Iter]=Tmp_Error[Iter]*the damping factor (step 686). The power controller method 600 goes to step 690 in FIG. 6D (step 688).

The power controller method 600 checks if the Iter value and PIDIterCount are greater than 0 (step 692). If so, an error_offset[Iter] is determined (step 694), otherwise the error_offset[Iter]=0 (step 696). The error_offset[Iter] in the step 694 is determined by setting an Expected_Error_ Change[Iter]=Tmp_Error[Iter−1]; Meas_Err_Change[Iter]= Measurederr [Iter−1]−Measurederr [Iter]; Error_ Offset[Iter]=Abs(Expected_Error_Change[Iter])−Abs (Meas_Err_Change[Iter]); Error_Offset[Iter]=Error_ Coefficient_Ke*Error_Offset[Iter]// Where Ke=0.3; and If (Error_Offset[Iter]>1) Error_Offset[Iter]=1; If (Error_Offset [Iter]<−1) Error_Offset[Iter]=−1; If (Measurederr [Iter−1] <0) Error_Offset[Iter]=0.0. The power controller method 600 sets Drive_Offset[Iter]=Tmp_Error[Iter]+Error_Offset [Iter]; Meas_Drive[Iter]=Wssmuxinput[Iter]−Wssmuxoutmeaspwr[Iter]−Wssmuxcct_Loss; and Set_Drive[Iter]=Meas_Drive[Iter]−Drive_Offset[Iter] (step 698). The power controller method 600 goes to step 702 in FIG. 6E (step 700).

The power controller method 600 checks if the Iter value and PIDIterCount are greater than 0 (step 704). If so, the power controller method 600 computes an offset to the determined Set_Drive[Iter] (step 706), otherwise the Set_ Drive[Iter]=Set_Drive[Iter] (step 708). The step 706 includes Prev_Set_Drive=Set_Drive[Iter−1]; Current_Meas_Drive=Meas_Drive[Iter]; Drive_Drift_Offset=Prev_Set_Drive−Current_Meas_Drive; Applied_Drive_Drift_Offset=Drift_Coefficient_Ks*Drive_ Drift_Offset; If (Measurederror[Iter−1]<0) Applied_Drive_ Drift_Offset=0.0; and Set_Drive[Iter]=Set_Drive[Iter]+Applied_Drive_Drift_Offset. The power controller method 600 computes a Set_Drive[Iter] from the Set_Drive[Iter] (step 710). The Set_Drive[Iter] is a value being provided to the WSS for setting the drive value and it has to be between a value of 0 and a Wss_Max_Drive value. The step 710 includes if (Set_Drive[Iter]<Wss_Min_Drive) Set_Drive [Iter]=Wss_Min_Drive; if (Set_Drive[Iter]>Wss_Max_ Drive) Set_Drive[Iter]=Wss_Max_Drive; and setting PIDitercount=PIDitercount+1.

The power controller method 600 sends the new drive (attenuation settings to the WSS) (step 712). The power controller method 600 checks if the Iter value is greater than 2 and the PIDitercount is greater than 0 (step 714). If so, the power controller method 600 will exit the PID loop if power is too low for certain iterations to converge to target (step 716). In the step 716, sumdrive=set_drive[iter]+set_drive [iter−1]+set_drive[iter−2]; and if (sumdrive<0.2) loop[iter]="slow-I", and the power controller method 600 goes to step 720 in FIG. 6B (step 718).

Figure 7:
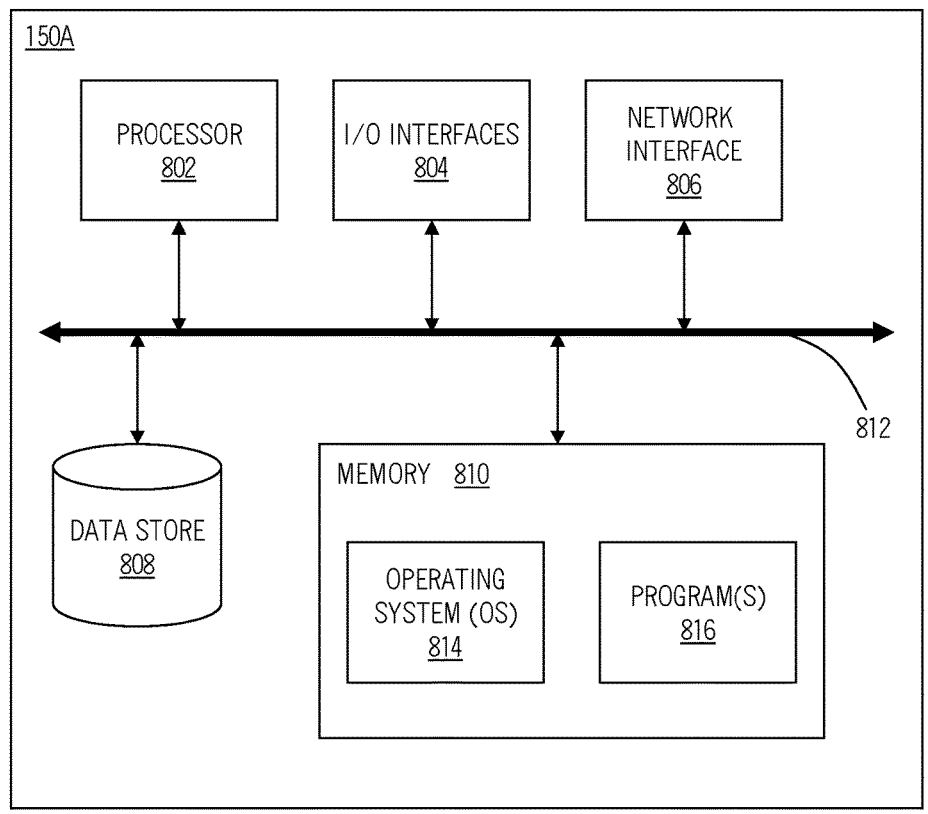
FIG. 7 is a block diagram of an exemplary implementation of a power controller.

Referring to FIG. 7, in an exemplary embodiment, a block diagram illustrates an exemplary implementation of a power controller 150A. The power controller 150A can be a digital processing device that, in terms of hardware architecture, generally includes a processor 802, input/output (I/O) interfaces 804, a network interface 806, a data store 808, and memory 810. It should be appreciated by those of ordinary skill in the art that FIG. 7 depicts the power controller 150A in an oversimplified manner, and a practical embodiment may include additional components and suitably configured processing logic to support known or conventional operating features that are not described in detail herein. The components (802, 804, 806, 808, and 810) are communicatively coupled via a local interface 812. The local interface 812 can be, for example but not limited to, one or more buses or other wired or wireless connections, as is known in the art. The local interface 812 can have additional elements, which are omitted for simplicity, such as controllers, buffers (caches), drivers, repeaters, and receivers, among many others, to enable communications. Further, the local interface 812 can include address, control, and/or data connections to enable appropriate communications among the aforementioned components.

The processor 802 is a hardware device for executing software instructions. The processor 802 can be any custom made or commercially available processor, a central processing unit (CPU), an auxiliary processor among several processors associated with the power controller 150A, a semiconductor-based microprocessor (in the form of a microchip or chip set), or generally any device for executing software instructions. When the power controller 150A is in operation, the processor 802 is configured to execute software stored within the memory 810, to communicate data to and from the memory 810, and to generally control operations of the power controller 150A pursuant to the software instructions. The I/O interfaces 804 can be used to receive user input from and/or for providing system output to one or more devices or components. The network interface 806 can be used to enable the power controller 150A to communicate on a network. For example, the I/O interfaces 804 and/or the network interface 806 can communicatively couple the power controller 150A to the WSS 106 and/or the OPM 140.

The data store 808 can be used to store data. The data store 808 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 808 can incorporate electronic, magnetic, optical, and/or other types of storage media. The memory 810 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 810 can incorporate electronic, magnetic, optical, and/or other types of storage media. Note that the memory 810 can have a distributed architecture, where various components are situated remotely from one another, but can be accessed by the processor 802. The software in memory 810 can include one or more software programs, each of which includes an ordered listing of executable instructions for implementing logical functions. The software in the memory 810 includes a suitable operating system (O/S) 814 and one or more programs 816. The operating system 814 essentially controls the execution of other computer programs, such as the one or more programs 316, and provides scheduling, input-output control, file and data management, memory management, and communication control and related services. The one or more programs 816 may be configured to implement the various processes, algorithms, methods, techniques, etc. described herein.

Additionally, it will be appreciated that some exemplary embodiments described herein, such as the power controller 150, 150A, may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, the power controller 150, 150A etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Figure 8A:
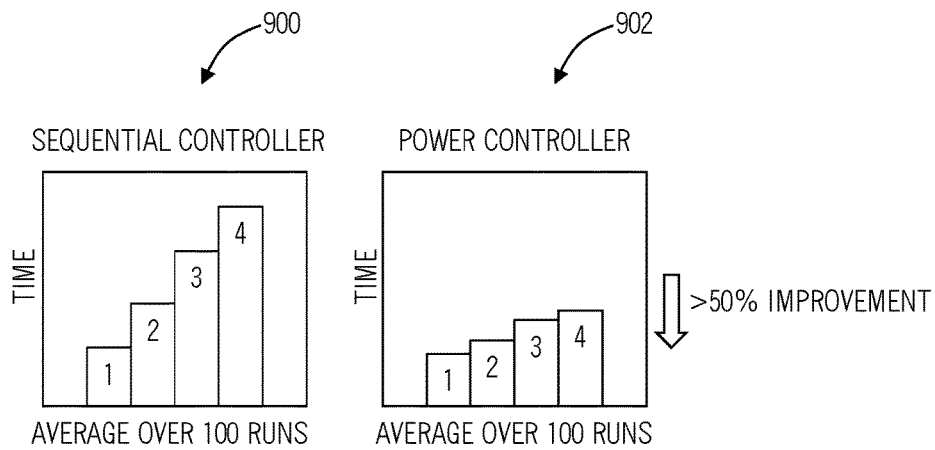
FIGS. 8A-8B are graphs of exemplary implementation of the power controller method compared with a sequential controller method.
Figure 8B:
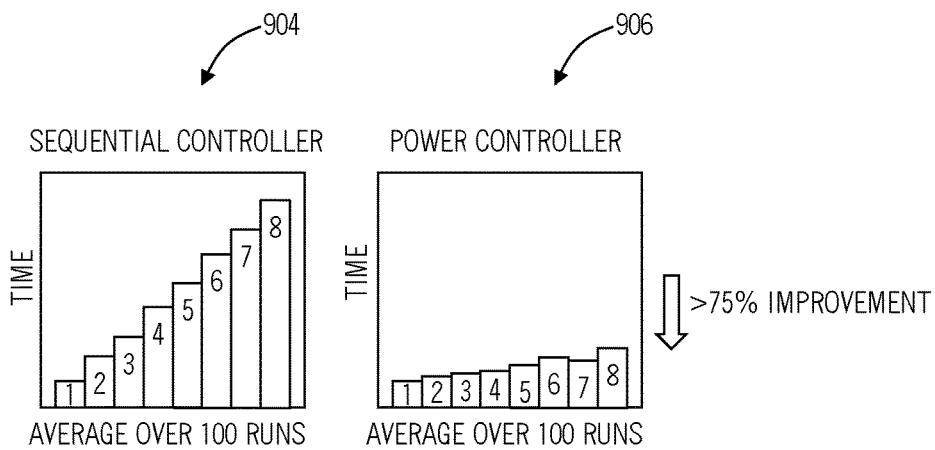

Referring to FIGS. 8A-8B, in exemplary embodiments, graphs 900, 902, 904, 906 illustrate channel add time using the power controller 150 and using a sequential controller method as described herein. The graphs 900, 902 show one to four ROADMs in cascade (the number in each bar in the graphs 900, 902 being indicative of the number of ROADMs in cascade). The graph 900 is for the sequential controller method, and the graph 902 is using the power controller 150 described herein. Further, the units are the same on the graphs 900, 902. As can be seen in the graphs 900, 902, the sequential controller method scales linearly in time based on the number of ROADMs. However, the power controller 150 is much faster without this linear scale limitation. The graphs 904, 906 show one to eight ROADMs in cascade (the number in each bar in the graphs 904, 906 being indicative of the number of ROADMs in cascade). The graph 904 is for the sequential controller method, and the graph 906 is using the power controller 150 described herein. Further, the units are the same on the graphs 904, 906. The graphs 904, 906 show similar results as the graphs 900, 902. In short, the timing improves by a factor of two with the power controller 150 for four ROADM sections, and for eight cascaded ROADM sections the timing improves almost by a factor of four.

In various exemplary embodiments described herein, reference is made to PID and a PID controller. Those of ordinary skill in the art will recognize that PID is one particular type of control loop and the systems and methods described herein contemplate use with any type of control loop. The systems and methods described herein could be applied to more general control loops including proportional-integral (PI), integral (I), and other hybrid types of linear control loops. That is, the systems and methods contemplate the various described adjustments to prevent overshooting could be applicable to any type of control loop. Additionally, reference is made herein to adding a single channel using the systems and methods, and those of ordinary skill in the art will recognize the systems and methods contemplate adding multiple channels concurrently and independently of one another with independent parameters using the same control loop techniques described herein.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure and are intended to be covered by the following claims.

What is claimed is:

1. A method implemented by a power controller associated with a node in an optical network with one or more sections, the method comprising:
responsive to adding a channel at the node, wherein the channel is added at an upstream node, performing a power control loop at the node based solely on power measurements determined at the node, wherein the performing is independent of and does not coordinate with any other power control loops performed for the channel at one or more additional nodes comprising the upstream node; and
adjusting power of the channel at the node based on the power control loop.

2. The method of claim 1, wherein the power control loop is performed without coordination comprising sending messaging between the node and the one or more additional nodes.

3. The method of claim 1, wherein at least one node of the one or more additional nodes performs a second power control loop on the channel at the at least one node while the power control loop is performed and there is no coordination between the power control loop and the second power control loop.

4. The method of claim 1, wherein the power measurements are per channel power measurements determined at the node.

5. The method of claim 1, wherein the power control loop operates based solely on the power measurements determined at the node.

6. The method of claim 1, wherein the power control loop is performed in parallel with associated power control loops at the one or more additional nodes as the channel is added to each of the node and the one or more additional nodes.

7. The method of claim 1, wherein the power control loop utilizes a proportional-integral-derivative (PID) control loop with a damped response where a PID response is proportionate to an error term between the power measurements and a set target power to achieve.

8. The method of claim 1, wherein at least one node of the one or more additional nodes is performing a second control loop upstream on the channel from the node, and wherein the power control loop is configured to stabilize a response on the channel based on an expected error change which maintains stability in the power control loop, without knowing an overall topology, channels in the network, and coordination with the at least one node.

9. The method of claim 1, wherein the power control loop runs in a close loop receiving constant feedback for the power measurements and performing multiple iterations to ultimately achieve the required target power.

10. A power controller associated with a node in an optical network with one or more sections, the power controller comprising:

circuitry adapted to, responsive to adding a channel at the node, wherein the channel is added at an upstream node, perform a power control loop at the node based solely on power measurements determined at the node, wherein the power control loop is performed independent of and does not coordinate with any other power control loops performed for the channel at one or more additional nodes comprising the upstream node; and circuitry adapted to cause adjustment of power of the channel at the node based on the power control loop.

11. The power controller of claim 10, wherein the power control loop is performed without coordination through messaging between the node and the one or more additional nodes.

12. The power controller of claim 10, wherein at least one node of the one or more additional nodes performs a second power control loop on the channel at the at least one node while the power control loop is performed and there is no coordination between the power control loop and the second power control loop.

13. The power controller of claim 10, wherein the power measurements are per channel power measurements determined at the node.

14. The power controller of claim 10, wherein the power control loop operates based solely on the power measurements determined at the node.

15. The power controller of claim 10, wherein the power control loop is performed in parallel with associated power control loops at the one or more additional nodes as the channel is added to each of the node and the one or more additional nodes.

16. The power controller of claim 10, wherein the power control loop utilizes a three state proportional-integral-derivative (PID) control loop with a damped response where a PID response is proportionate to an error term between the power measurements and a set target power to achieve.

17. The power controller of claim 10, wherein at least one node of the one or more additional nodes is performing a second control loop upstream on the channel from the node, and wherein the power control loop is configured to stabilize a response on the channel based on an expected error change which maintains stability in the power control loop, without knowing an overall topology, channels in the network, and coordination with the at least one node.

18. The power controller of claim 10, wherein the power control loop runs in a close loop receiving constant feedback for the power measurements and performing multiple iterations to ultimately achieve the required target power.

19. An optical node, comprising:

one or more degrees comprising components configured to selectively alter power of a channel being added to the one or more degrees;

an optical power monitor adapted to measure an output power of the channel; and a power controller communicatively coupled to the at least one degree and the optical power monitor, wherein the power controller is configured to responsive to adding a channel at the node, wherein the channel is added at an upstream node, perform a power control loop at the node based solely on power measurements determined by the optical power monitor, wherein the power control loop is performed independent of and does not coordinate with any other power control loops performed for the channel at one or more additional nodes comprising the upstream node, and cause adjustment of power of the channel by the components based on the power control loop.

20. The optical node of claim 19, wherein the power control loop is performed without coordination through messaging between the optical node and the one or more additional nodes.

* * * * *